United States Patent
Rikoski

(10) Patent No.: US 9,399,503 B2
(45) Date of Patent: Jul. 26, 2016

(54) SYSTEMS AND METHODS FOR NAVIGATING AUTONOMOUS UNDERWATER VEHICLES

(71) Applicant: Hadal, Inc., Oakland, CA (US)

(72) Inventor: Richard J. Rikoski, Alameda, CA (US)

(73) Assignee: Hadal, Inc., Oakland, CA (US)

( * ) Notice: Subject to any disclaimer, the term of this patent is extended or adjusted under 35 U.S.C. 154(b) by 0 days.

(21) Appl. No.: 14/213,233

(22) Filed: Mar. 14, 2014

(65) Prior Publication Data

US 2014/0328141 A1 Nov. 6, 2014

Related U.S. Application Data

(60) Provisional application No. 61/792,708, filed on Mar. 15, 2013.

(51) Int. Cl.
*G01S 15/00* (2006.01)
*B63B 35/40* (2006.01)
(Continued)

(52) U.S. Cl.
CPC .......... *B63B 35/40* (2013.01); *B22D 31/00* (2013.01); *B29C 44/3415* (2013.01); *B63B 3/13* (2013.01); *B63B 27/16* (2013.01); *B63B 27/36* (2013.01); *B63G 8/00* (2013.01); *B63G 8/001* (2013.01); *B63G 8/39* (2013.01); *F17C 1/00* (2013.01); *G01S 7/52004* (2013.01); *G01S 15/02* (2013.01); *G01S 15/104* (2013.01); *G01S 15/588* (2013.01);
(Continued)

(58) Field of Classification Search
CPC ..... G01S 15/104; G01S 15/107; G01S 15/60; G01S 15/8904; G01S 15/02; G01S 15/588
See application file for complete search history.

(56) References Cited

U.S. PATENT DOCUMENTS 4,244,026 A    1/1981    Dickey, Jr.
4,559,602 A * 12/1985    Bates, Jr. ............ G06F 17/10
                                         702/71

(Continued)

FOREIGN PATENT DOCUMENTS

EP         0016716 A1    10/1980
JP         62103589 A *    5/1987

(Continued)

OTHER PUBLICATIONS

Hegrenaes, et al., "Doppler water-track aided inertial navigation for autonomous underwater vehicle", Oceans 2009, IEEE, Piscataway, NJ.

(Continued)

*Primary Examiner* — Luke Ratcliffe
*Assistant Examiner* — Hovhannes Baghdasaryan
(74) *Attorney, Agent, or Firm* — Ropes & Gray LLP

(57) ABSTRACT

Systems and methods are described herein for a variable-depth sonar. A null in the frequency response between a first and second operating frequency band is identified. A center operating frequency for each of the first and the second operating band is adjusted based on the ambient pressure. Furthermore, the velocity state of a vehicle may be calculated using periodic velocity updates. At least one transducer transmits a first signal in a first direction, and a Doppler sensor receives an echo of the first signal. The vehicle is turned in a second direction, and the at least one transducer transmits a second signal in the second direction. Using the first and the second velocity measurement, a vehicle velocity state is calculated.

8 Claims, 8 Drawing Sheets

(51) Int. Cl.
- *B22D 31/00* (2006.01)
- *F17C 1/00* (2006.01)
- *B63G 8/00* (2006.01)
- *B63G 8/39* (2006.01)
- *B29C 44/34* (2006.01)
- *B63B 3/13* (2006.01)
- *H01M 2/02* (2006.01)
- *H01M 10/052* (2010.01)
- *H01M 10/42* (2006.01)
- *B63B 27/16* (2006.01)
- *B63B 27/36* (2006.01)
- *G01S 7/52* (2006.01)
- *G01S 15/10* (2006.01)
- *G01S 15/60* (2006.01)
- *G01S 15/02* (2006.01)
- *G01S 15/58* (2006.01)
- *G01S 15/89* (2006.01)

(52) U.S. Cl.
CPC ............... *G01S 15/60* (2013.01); *H01M 2/024* (2013.01); *H01M 2/025* (2013.01); *H01M 10/052* (2013.01); *H01M 10/4257* (2013.01); *B63B 2027/165* (2013.01); *B63B 2035/405* (2013.01); *B63G 2008/004* (2013.01); *B63G 2008/008* (2013.01); *G01S 15/107* (2013.01); *G01S 15/8904* (2013.01); *Y10T 29/49117* (2015.01); *Y10T 29/49826* (2015.01); *Y10T 29/49893* (2015.01); *Y10T 29/49989* (2015.01); *Y10T 29/5176* (2015.01); *Y10T 428/1352* (2015.01); *Y10T 428/1376* (2015.01)

(56) References Cited

U.S. PATENT DOCUMENTS

| | | | |
|---|---|---|---|
| 8,854,923 B1* | 10/2014 | Eyster | H04R 17/00 310/317 |
| 2007/0025184 A1 | 2/2007 | Scoca et al. | |
| 2009/0238042 A1 | 9/2009 | Hawkinson et al. | |

FOREIGN PATENT DOCUMENTS

| | | |
|---|---|---|
| JP | 09243733 | 9/1997 |
| WO | WO-97/47990 A1 | 12/1997 |

OTHER PUBLICATIONS

Bjorno, "Developments in sonar technologies and their applications," Underwater Technology Symposium (UT), 2013 IEEE International, IEEE, pp. 1-8, XP032410848 (Mar. 5, 2013).

* cited by examiner

SYSTEMS AND METHODS FOR NAVIGATING AUTONOMOUS UNDERWATER VEHICLES

CROSS-REFERENCE TO RELATED APPLICATIONS

This application claims the benefit of U.S. Provisional Application Ser. No. 61/792,708, filed Mar. 15, 2013, the contents of which are incorporated by reference herein in their entirety.

BACKGROUND

In most land-based applications, navigation is often aided by in-place infrastructure such as GPS, radio beacons or a priori maps. Navigation and mapping underwater is difficult because among other things, wide-coverage underwater GPS-equivalents do not exist and large portions of the sea bed are still unexplored.

Current techniques for underwater navigation use publicly available bathymetry maps. However, these maps are relatively coarse and unsuitable for precision navigation. Other sonar-based navigation systems rely on positioning schemes that use the sonar data itself. For example, on-the-fly acoustic feature-based systems attempt to use sonar to detect naturally occurring landmarks. Other solutions to the navigation problem include deploying low-cost transponders in unknown locations thereby enabling range-based measurements between the vehicle and transponder beacon. However, these transponders are often deployed at locations that are at great distances from each other, and often only partially observable because of the range-only information. Thus, these technologies are unsuitable for navigation across small vehicle paths.

Recent technologies permit navigation of underwater terrain relative to a prior map of the terrain. Such technologies use synthetic aperture sonar systems for generating images of the terrain, which are then compared against a prior image associated with the terrain. Underwater vehicles may then be able to navigate on the terrain relative to their location on the map. These technologies, however, suffer from a plurality of deficiencies including the amount of power consumed, size and shape of the systems. Additionally, the performance of such navigation systems dramatically decreases as transmitter frequencies increase and wavelengths decrease, or as range increases.

Most sonar equipment, such as sonar projectors and receivers, have frequency responses that include nulls. Engineers typically design the operating bands of such sonar projectors and receivers to be between the nulls (especially for sonars being operated off resonance). For example, a sonar receiver may be designed to operate in several operating bands, such as a low frequency (LF) band and a separate high frequency (HF) band, with an intentionally engineered null separating the two bands. However, as increasing pressure is applied to the sonar elements and the elements compress, the frequency response may change. The nulls may move into the operating band, thereby degrading the performance of the sonar equipment. One typical solution is to design the sonar to operate within a depth band (e.g. surface to 3000 m, 3000 m-6000 m, etc.). However, this is not feasible for applications that operate in a range of depths and ocean environments. In such varied environments, several versions of the sonar equipment would be required for each of the depth bands of the varied environments, driving up weight and cost. Thus, there exists a need for a variable-depth sonar system.

Inertial navigation is a common method of navigation underwater, but it suffers from errors that grow with time. Noisy acceleration measurements lead to velocity estimates with integrated errors and position estimates with doubly integrated errors. These errors can be alleviated by explicitly measuring velocity (even occasionally), thereby allowing the inertial system to remove biases in the velocity estimate and significantly reducing the rate of position error growth. State of the art Doppler sensors typically consist of multiple clustered pencil beam transducers. Transmitting signals in multiple directions allows the cluster of transducers to measure the velocity along multiple vectors (typically not orthogonal, although they could be). Those multiple velocity vectors can then be fused to provide a true three-dimensional velocity estimate.

SUMMARY

As noted above, it may be desirable to be able to navigate terrain (whether on land or underwater) in a vehicle equipped appropriately with sensors that allow the vehicle to navigate the terrain relative to a prior map of the terrain. There exists several sonar-based imaging and mapping technologies, including, among others, sidescan sonar and synthetic aperture sonar (SAS). In these technologies, the quality of the map or image is related to its angular resolution. The angular resolution, which is the minimum angle for which two targets can be separated in a sonar image, is inversely proportional to the array length measured in wavelengths. Longer arrays or higher frequencies (smaller wavelengths) gives better angular frequencies. Sidescan sonar uses a fixed-length moving array of receivers to cover different parts of the seafloor. Typical sidescan sonars produce one or a few beams, and an image is produced by moving the sonar and using repeated pulses. Because longer arrays typically require more electronics, hardware and space on the vehicle, sidescan sonar systems include small arrays that operate at high frequencies (typically, although not always, greater than 100 kHz). However, frequency dependent absorption of sound in the oceans places limits on the range of high frequency sidescan sonars.

Synthetic aperture sonar (SAS) imaging systems were successful in overcoming some of the deficiencies of side-scan sonar systems. SAS technology uses the forward motion of a small physical array to synthesize a much longer array, thus resulting in a much finer along-track resolution and higher signal to noise ratios (SNR) than that of an actual physical array. Thus, SAS allows for much higher resolutions at lower frequencies than sidescan sonar systems. In fact, to provide for higher ranges than sidescan sonar, some current day SAS technologies operate at low frequencies (less than 100 kHz). In addition to the increased range, low frequencies allow for higher relative bandwidths Both sidescan and SAS technologies have been used for map-based navigation systems. Sidescan sonar images have been incoherently processed using template matching and spatial constraints to provide navigational information and recognize mine-like objects. Recently, the holographic nature of a low-frequency SAS image, namely, the observation that low-frequency SAS images capture the same target from different vantage points, has been leveraged for coherent terrain recognition and navigation. Thus, low frequency SAS is generally better suited for map-based navigation than high-frequency sidescan sonar.

Nevertheless, there are several disadvantages of low frequency SAS. Lower frequencies demand longer apertures, which in the case of moving SAS platforms could introduce errors and angular variations. Furthermore, low-frequency systems require larger electronics and more power, luxuries that may not be available on smaller autonomous underwater vehicles (AUVs) or unmanned aerial vehicles (UAVs). Likewise, low frequency projectors are often heavier than their high frequency equivalents, preventing their use on small lightweight systems.

Current map-based navigation technologies discourage the use of high-frequency SAS (greater than about 100 kHz) for navigation because of increased attenuation and poor performance, which in turn was thought to be attributable to the effects of shadowing, occlusion and complex 3D relief changes in relief. These effects were thought to change the signature of the sound signal, and accordingly break down the assumption that a change in vertical aspect maps to a change in pitch.

Systems and methods are described herein for using a variable-depth sonar. According to one aspect, one or more operating frequency bands are determined for sonar equipment. Nulls in the frequency response are identified and tuned during transducer design so as to lie between the desired operating frequency bands. In some embodiments, the null in the frequency response occurs between a first and a second operating frequency band; in other embodiments, nulls occur between a first, second, and third operating frequency bands. An ambient pressure is determined, and the center operating frequencies for each of the operating bands is adjusted based on the ambient pressure. The center frequencies may be centered between the nulls in the frequency response and an upper limit or bound in the operating bands. In some embodiments, determining an ambient pressure comprises determining a current depth.

The present application further includes systems and methods for calculating a velocity state of a vehicle. According to one aspect, at least one transducer transmits a first signal in a first direction, and a Doppler sensor receives an echo of the first signal. The at least one transducer may be approximately equal in size to the diameter of the vehicle and directed along a body length (lengthwise) of the vehicle. The at least one transducer may transmit a second signal in a second direction. In some embodiments, the vehicle may be physically turned from the first direction to the second direction. In other embodiments, the second direction may be substantially the same as the first direction. In some embodiments, the at least one transducer may comprise a cluster of two or more transducers, wherein a first transducer transmits a signal in the first direction, and a second, different transducer transmits a signal in the second direction. In such embodiments, the first transducer and the second transducer may transmit their respective signals either simultaneously or in sequence at different times. In alternate embodiments only a single transducer may be used to transmit the first and second signals in sequence.

In some embodiments, the second direction is orthogonal to the first direction. In some embodiments, the second velocity measurement comprises portions of the vehicle velocity state that are not observable from the first velocity measurement. The Doppler sensor receives an echo of the first and second signals, and at least one velocity measurement may be calculated from the received echoes. Using the at least one velocity measurement a vehicle velocity state is calculated. In some embodiments, the at least one velocity measurement may comprise a first velocity measurement based on the first signal, and a second velocity measurement based on the second signal. In alternative embodiments, the at least one velocity measurement may comprise a single velocity measurement based on both the first signal and the second signal. In some embodiments, the at least one velocity measurement may be provided to a navigation filter in order to calculate the vehicle velocity state. In some embodiments, this navigation filter may be an Extended Kalman Filter. In other embodiments, a vehicle position state is further calculated based on the vehicle velocity state.

In certain embodiments, a third velocity measurement may be taken from a third direction, wherein the third direction is different than the first and second direction. The vehicle velocity state may be based on the first, the second, and the third velocity measurements.

Other objects, features, and advantages of the present invention will become apparent upon examining the following detailed description, taken in conjunction with the attached drawings.

BRIEF DESCRIPTION OF THE FIGURES

The systems and methods described herein are set forth in the appended claims. However, for purpose of explanation, several illustrative embodiments are set forth in the following figures.

DETAILED DESCRIPTION

Figure 1:
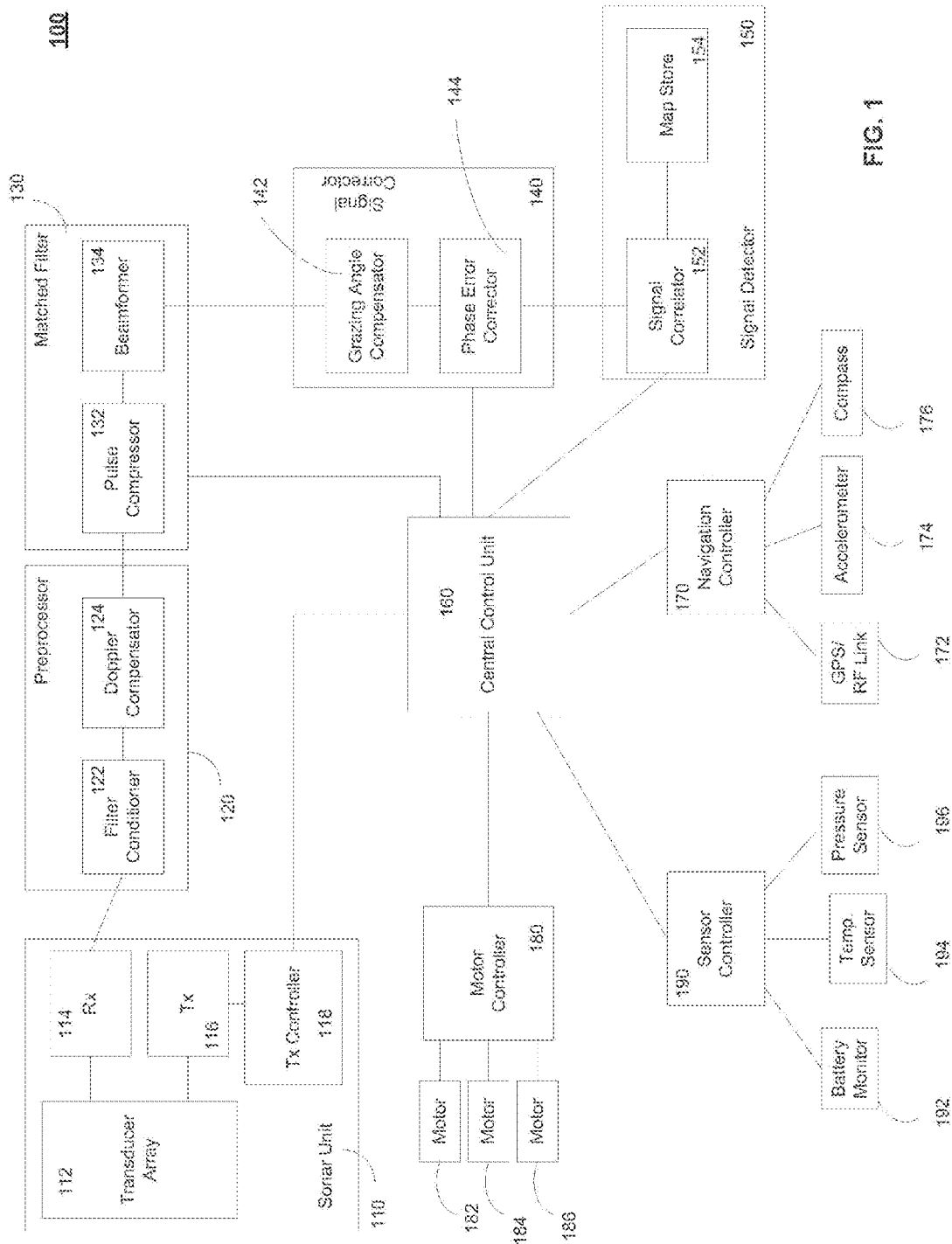
FIG. 1 is a block diagram depicting an exemplary remote vehicle, according to an illustrative embodiment of the present disclosure.

To provide an overall understanding of the invention, certain illustrative embodiments will now be described. However, it will be understood by one or ordinary skill in the art that the systems and methods described herein can be adapted and modified for other suitable applications and that such other additions and modifications will not depart from the scope hereof.

The systems and methods described herein include high-frequency ("HF") holographic navigation, namely map-based navigation using the multi-aspect holographic-nature of synthetic aperture sonar (SAS) images captured at frequencies greater than or equal to about 100 kHz. The systems and methods described herein also include low frequency ("LF") holographic navigation at frequencies less than about 100 kHz. In particular, the systems and methods described herein allow for coherent correlation between images, currently captured, and prior maps when there is an overlap in frequency and aspect. Such coherent correlation allows for position and/or heading-based navigation. At high-frequency, the inventor has recognized that images suffer from spatially varying phase errors (e.g., range varying phase errors), which cause image and/or correlation distortion. Such phase errors may exist even at low frequencies when there are altitude variations. In certain embodiments, when the phase errors are much smaller than the bandwidth, although images may not be distorted, correlation (and therefore navigation) may become difficult. The systems and methods described herein overcome the deficiencies of the prior art by introducing a phase error corrector configured to cut the image into smaller regions where phase is relatively constant and use these phase measurements to correct portions of the image.

The systems and methods described here make use of various other aspects of the holographic nature of synthetic aperture images, which the inventor has recognized. For example, systems and methods are described herein for determining a three-dimensional model of a shape based on its two dimensional shading and shadowing of acoustic signals. The systems and methods described herein include methods for positioning sensors (such as Tsunami sensors) and navigation beacons with high-precision using HF holographic navigation. The systems and methods described herein include methods for monitoring and modeling a water column using an autonomous underwater vehicle (AUV) based on high-precision location measurements obtained using HF holographic navigation. In certain embodiments, the systems and methods include a seismic survey system having a combination of orthogonal transmitters and multiple receivers to form a full planar synthetic aperture sonar with higher resolution.

In other aspects, the systems and methods described herein include adding multiple transmitters to the array and generating orthogonal pinging sequences. In particular, the systems and methods described herein include a SAS having a low-grating sidelobe, a SAS having a high coverage rate using multiple transmitters, and an overpinging sequence for increasing the range of the SAS system. The systems and methods described herein further include bistatic and monostatic holographic gapfilling techniques for localizing an emitter or receiver with high precision relative to a terrain. In still other aspects, the systems and methods described herein include simultaneous localization and mapping (SLAM) techniques that involve beamforming a real aperture image such that it can be coherently correlated with a prior real aperture image of overlapping frequencies. Each of these and other systems and methods described herein may be used independently of each other or in any suitable combination of one or more any other system and method. Modifications and variations described with reference to a system and method described herein may be applied to any other system and method described herein, without departing from the scope of the present disclosure.

Most sonar projectors and receivers have frequency responses that include nulls. Engineers typically design the operating bands of such sonar projectors and receivers to be between the nulls (especially for sonars being operated off resonance). For example, a sonar receiver may be designed to operate in several operating bands, such as a low frequency (LF) band and a separate high frequency (HF) band, with an intentionally engineered null separating the two bands. However, as increasing pressure is applied to the sonar elements and the elements compress, the frequency response may change, which may cause the nulls to move into the operating band, thereby degrading the performance of the frequency response. One typical solution is to design the sonar to operate within a depth band (e.g. surface to 3000 m, 3000 m-6000 m, etc.). However, this is not feasible for applications that operate in a range of depths and ocean environments. In such varied environments, several versions of the sonar equipment would be required for each of the depth bands of the varied environments, driving up weight and cost. Thus, there exists a need for a variable-depth sonar system.

The systems and methods described herein solve this problem by shifting the center frequency in response based on pressure in order to control the behavior of the frequency response. Typically, this is done to keep the center frequency in a fixed location between nulls in the frequency response, but it could also be done to maximize resolution for a given range and power (taking advantage of decreases in absorption with depth), to minimize power with depth (reducing transmit power to reflect decreased absorption), or to shape the power with frequency (as the frequency response changes varying the power to maintain a flat transmit spectrum or a flat receive spectrum). For the flat receive spectrum case, this can be at any location within the range of the sonar (with the understanding that a broadband sonar with a flat response at transmit will have a reduced response at some frequencies, generally higher, at long range, and a sonar with a flat response at max range will have a frequency response biased in favor of higher frequency at close range). Similarly, the frequency response and frequency content can be varied to provide uniform SNR in response to varying noise conditions as well.

In addition, systems and methods for calculating a velocity state of a vehicle are described herein. As discussed above, inertial navigation is a common method of navigation underwater, but it suffers from errors that grow with time. Noisy acceleration measurements lead to velocity estimates with integrated errors and position estimates with doubly integrated errors. These errors can be alleviated by explicitly measuring velocity (even occasionally), thereby allowing the inertial system to remove biases in the velocity estimate and significantly reducing the rate of position error growth. State of the art Doppler sensors typically consist of multiple clustered pencil beam transducers. Transmitting signals in multiple directions allows the cluster of transducers to measure the velocity along multiple vectors (typically not orthogonal, although they could be). Those multiple velocity vectors can then be fused to provide a true three-dimensional velocity estimate. The sensor for estimating velocity along a vector using Doppler shifts is referred to herein as a Doppler Velocity Log (DVL).

Most Doppler sensors operate at relatively high frequencies for at least two reasons. First, the Doppler shift is a fixed percentage of the center frequency, but the spectral resolution is a function of the signal length. Therefore higher frequencies can make a more precise measurement for a fixed length signal, for they use a shorter signal given a fixed desired precision. Second, since it is desirable to measure the Doppler shift in a given direction, it is common to use an aperture to give the transmitted/received signal directionality. The higher the frequency, the smaller the aperture that is necessary. Unfortunately, high frequency sound is rapidly absorbed. The Doppler sensors common to autonomous underwater vehicles generally lose Doppler lock within a few hundred meters of the ocean bottom. A dive to the bottom of the Challenger Deep (11 km depth) at a 45 degree angle would require a sensor with a range closer to 15.5 km, as opposed to a few hundred meters. Significantly lower frequencies are necessary to achieve such a range.

In one embodiment, Correlation Velocity Logs (CVLs) coherently correlate measurements from a single sensor to measure displacement. Like DVLs, their range and precision are related to frequency and bandwidth. In this embodiment, CVLs make repeated observations within a well defined area in order to have a reasonable correlation, which requires additional control and system complexity. Alternative methods of estimating velocity via position displacement (such as repeated incoherent measurements of distinct landmarks) are possible, but require higher-level decision making (something which robots are generally not very good at) and often do not approach the accuracy of coherent correlation. Herein it is assumed that a CVL is correlating a signal in range and has a phase level precision that results in an improved velocity estimate as frequencies increase. The systems and methods described herein may be directed towards both DVL and CVL applications, with CVL applications being the preferred embodiment. It is to be understood that as long as the vehicle is stable enough to produce two echoes that can be correlated, a CVL and DVL may be used in the same manner, and the operating techniques used by a system with a DVL can be adopted by a system utilizing a CVL. In such cases, it is also to be understood that the update equation used for a DVL and CVL may differ. In an alternative interpretation, which is not being used herein, a CVL may refer to a technique which utilizes multiple receivers aimed at broadside. In embodiments using this interpretation of CVL, a first signal is transmitted, and echoes received at multiple receivers are compared to determine forward progress. In such embodiments, higher frequencies do not improve the velocity estimate. Further details on this alternative interpretation of CVL may be found in Quazi, *An Overview on the Time Delay Estimate in Active and Passive Systems for Target Localization*, IEEE Transations on Acoustics, Speech, and Signal Processing, Vol. ASSP-29, No. 3, June 1981, the entire contents of which are incorporated herein by reference.

In some embodiments, velocity and/or position are measured acoustically. In the preferred implementation it is a single large, parametric transducer on the bow of a diving vehicle that can produce a signal suitable for use as either a DVL or a CVL. The robot dives along a fixed, straight path while it pings and receives a signal allowing for a velocity measurement along that path (not in orthogonal directions). Then the robot turns, dives along a new path (preferably orthogonal but not necessarily), and makes another measurement to observe portions of the vehicle velocity state that were previously unobservable. These first two velocity measurements may be sufficient to fully observe the vehicle velocity state when combined with depth, and the vehicle velocity state may be calculated from the first two velocity measurements. In some embodiments, by making a third turn, the vehicle can make a third measurement in order to fully observe the velocity state. The vehicle may then repeat the process to continue to update the velocity state.

In some embodiments, the third velocity measurement may be made by a separate transducer. In some embodiments, instead of using a cluster of transducers (like many commercially available Dopplers), the systems and methods described herein may employ a single parametric transducer (although it could use multiple transducers). In this manner, the third velocity measurement may be made by a single transducer, with the third signal transmitted in sequence after the first two signals. In still other embodiments, the third velocity measurement may be observed by a completely different type of sensor, such as a depth sensor.

In one embodiment, a pure Doppler sensor may be used to calculate the vehicle velocity state. The Doppler sensor may comprise both a transducer to transmit signals and a Doppler signal receiver to detect echoes of the signals. The sensor may use separate transmit and receive elements or use a single element for both transmitting and receiving. To achieve bottom lock at long distances, the sensor may use low frequencies. To minimize the size of the transducer element it may use a parametric transducer. A parametric transducer may transmit a pair of high frequency signals which, due to non-linear interaction in the water, turn into a sum and difference frequency. The summed frequency is rapidly absorbed, while the difference frequency propagates a great distance. The Doppler sensor may be mounted in a convenient location on the vehicle which is not occluded by other hardware. In some embodiments, the Doppler sensor may be flush mounted on the bottom of the vehicle. In some embodiments, the Doppler sensor may be mounted on the bow of the vehicle, depending on obstacle avoidance sonar constraints, or it may share elements with an obstacle avoidance sonar. In yet other embodiments, the Doppler sensor may be mounted off the body out in the flow of the medium (e.g., air or water, depending on the type of vehicle). However, in some embodiments, the Doppler sensor may be comparable in size to the vehicle's diameter, thus it is likely to severely disrupt the flow. In this case, the Doppler sensor may be covered by an acoustically transparent fairing.

While diving, the vehicle may maintain a fixed heading while transmitting using the transducer and then waiting to receive the echo. The total time of flight may be very long. As an illustrative example, at a 45 degree angle directly above the Challenger deep (11 km depth) the time of flight would be approximately 21 seconds. Upon reception of the Doppler shifted signal, the velocity measurement is used to update a navigation filter (such as, but not limited to, an Extended Kalman Filter). Any suitable navigation filter may be used, and the navigation filter may be incorporated into the CCU, described in further detail below in connection with FIG. 1. The navigation filter may continuously update one or more of the position, velocity, and acceleration state of the vehicle. The navigation filter may employ any suitable coordinate system, including, but not limited to, a typical Cartesian coordinate system (in 1D, 2D, or 3D), a rotating coordinate system, a vehicle-centered coordinate system, or an Earth-centered coordinate system. The position, velocity, and acceleration states may each comprise components suitable for whatever coordinate system is employed by the navigation filter. For example, in a traditional 3D Cartesian coordinate system with X, Y, and Z directions, the velocity state may comprise a X velocity component, a Y velocity component, and a Z velocity component.

The navigation filter may integrate the acceleration state to determine the velocity state, and integrate the velocity state to determine the position state. The navigation filter may be periodically updated at predetermined time intervals or varying time intervals. The navigation filter may also be configured to receive one or more sensor measurements and update any of the position, velocity, and acceleration states of the vehicle based on the sensor measurements. For example, one or more Doppler signals may be used to calculate a velocity measurement, which may be used to update the vehicle velocity state. In some embodiments, the navigation filter may track the variance of the estimated position, velocity, and acceleration states as well as the expected variance of each of the one or more sensor measurements. Based on the expected variance of the sensor measurements, the navigation filter may update the variance of one or more of the position, velocity, or acceleration states accordingly. As an illustrative example, a depth sensor may have a high degree of accuracy and low variance relative to the expected variance of the position state. An update to the position state based on a measurement from such a depth sensor may greatly reduce the variance and uncertainty in the component(s) of the position state corresponding to the direction of the depth measurement. Updates from one or more sensors may be received periodically at any suitable time interval.

Because a navigation filter is being periodically updated, it is not necessary to fully observe the three dimensional velocity in a single measurement. Rather, a single Doppler fix may improve the velocity estimate along its vector. Although the Doppler fix can be applied to update the most recent velocity estimate, a better filter may explicitly maintain state information corresponding to the time of transmission as well as state information about the time of reception and base the measured Doppler shift on both velocities (i.e. $\Delta f = g(u(t), u(t-\Delta t)))$. After receiving one or more Doppler measurements, the vehicle may turn or rotate so as to orient the transducer in a new direction and update the velocity in that new direction. In some embodiments, the new direction may be orthogonal to the first direction. In one illustrative example, the vehicle may dive in a polygonal spiral with three sides. Other dive profiles are possible.

Although a parametric sonar can produce a low frequency sound in a small package that can be used to measure the Doppler shift relative to a distant sea floor, the core issue of low precision remains. With a one second transmission the spectral resolution is approximately 1 Hz. At 1 kHz that would be approximately 0.1% of the sound velocity or 15 cm/s. In some embodiments, a parametric transducer could be used to create a correlation sonar along the direction of vehicle travel. In general, a transducer with aperture D looking in a given direction will be able to correlate a first ping of a bottom with a subsequent ping from a shifted position provided that the aperture is not shifted off boresight by more than D/2 (it can be shifted along boresight). By making an initial observation of the bottom followed by a subsequent observation it is possible to measure the distance traveled between observations. As a measurement of the difference between two positions, this has the advantage of not updating a state which has to be integrated to get position, so it is less susceptible to noise. Unfortunately, it only allows an update along one vector at a time. The vehicle needs to rotate to another direction to make another pair (or more) of measurements to knock down the velocity error along another vector. In some embodiments, the aperture describing "tunnel" the vehicle needs to swim down while making the measurement may be larger than D/2. The D/2 rule is based on the footprint created by a traditional transducer. When applied to a parametric transducer, this constraint may be expanded to be f/df*D/2, where f is the primary frequency, df is the difference frequency, and D is the original aperture. As an illustrative example, for a 10:1 reduction in frequency the tunnel expands to 5D.

Alternatively, it is possible to navigate using holographic navigation using a single or multiple channel parametric sonar. Although a SAS with an element of size D typically samples with a spacing of D/2, a parametric SAS only needs a spacing of f/df*D/2, where f is the primary frequency and df is the difference frequency. With a properly constructed parametric SAS image it is possible to navigate using single channel holographic navigation. Alternatively, two parametric SAS images can be compared for a navigation solution. In the preferred embodiment, a vehicle uses a parametric sonar to create a parametric SAS image while diving. One or more parametric transducers will be aimed at broadside. Whether the transducer is squinted or not will depend on the dive angle and the beam width. A SAS image can be made at all depths, only near the surface, only near the bottom, or at some convenient mid-water location. Data can be used for continuous updates or as part of a batch update once the vehicle has reached the bottom. Once the vehicle reaches the bottom and can achieve bottom lock with high frequency sonar the errors in a single channel parametric SAS image can be expected to be considerably reduced. For this situation is may make sense to reference a clean but highly biased bottom SAS image would a single channel fix from near the surface (where there is high navigational precision).

In one embodiment, the vehicle predominantly remains in one plane during a dive and consistently sees the same bottom terrain from approximately the same grazing angles. In an alternative embodiment, the robot traverses multiple dive planes during a descent. As an illustrative example, the vehicle may travel a path akin to a spiral projected onto the side of a pyramid. The vehicle may start at the top of the pyramid and begin a descent. When the vehicle is on any given face of the pyramid the grazing angle of its observation of the ground at the intersection with the pyramid would be constant. By traveling only along the sides of the pyramid with a constant dive angle the robot would tend to see the area at the bottom of the pyramid within the same range of horizontal angles. This would facilitate meeting all of the holographic navigation and grazing angle compensation constraints.

FIG. 1 is a block diagram depicting an illustrative remote vehicle, according to an illustrative embodiment of the present disclosure. The system 100 includes a sonar unit 110 for sending and receiving sonar signals, a preprocessor 120 for conditioning a received (or reflected) signal, and a matched filter 130 for performing pulse compression and beamforming. The system 100 is configured to allow for navigating using high-frequency (greater than about 100 kHz) sonar signals. To allow for such HF navigation, the system 100 includes a signal corrector 140 for compensating for grazing angle error and for correcting phase error. The system 100 also includes a signal detector 150 for coherently correlating a received image with a map. In some embodiments, the system 100 includes an on-board navigation controller 170, motor controller 180 and sensor controller 190. The navigation controller 170 may be configured to receive navigational parameters from a GPS/RF link 172 (when available), an accelerometer 174, a gyroscope, and a compass 176. The motor controller 180 may be configured to control a plurality of motors 182, 184 and 186 for steering the vehicle. The sensor controller 190 may receive measurements from the battery monitor 172, a temperature sensor 194 and a pressure sensor 196. The system 100 further includes a central control unit (CCU) 160 that may serve as a hub for determining navigational parameters based on sonar measurements and other navigational and sensor parameters, and for controlling the movement of the vehicle.

In the context of a surface or underwater vehicle, the CCU 160 may determine navigational parameters such as position (latitude and longitude), velocity (in any direction), bearing, heading, acceleration and altitude. The CCU 160 may use these navigational parameters for controlling motion along the alongtrack direction (fore and aft), acrosstrack direction (port and starboard), and vertical direction (up and down). The CCU 160 may use these navigational parameters for controlling motion to yaw, pitch, roll or otherwise rotate the vehicle. During underwater operation, a vehicle such as an AUV may receive high-frequency real aperture sonar images or signals at sonar unit 110, which may then be processed, filtered, corrected, and correlated against a synthetic aperture sonar (SAS) map of the terrain. Using the correlation, the CCU may then determine the AUV's position, with high-precision and other navigational parameters to assist with navigating the terrain. The precision may be determined by the signal and spatial bandwidth of the SAS map and/or the acquired sonar image. In certain embodiments, assuming there is at least a near perfect overlap of the sonar image with a prior SAS map with square pixels, and assuming that the reacquisition was performed with a single channel having a similar element size and bandwidth, and assuming little or no losses to grazing angle compensation, the envelope would be about one-half the element size. Consequently, in certain embodiments, the peak of the envelope may be identified with high-precision, including down to the order of about $\frac{1}{100}^{th}$ of the wavelength. For example, the resolution may be less than 2.5 cm, or less than 1 cm or less than and about 0.1 mm in the range direction.

Generally, terrain recognition using long wavelength (low-frequency) sensors may be difficult due to the aspect dependence of object signatures. Sonar or radar images may be dominated by speckle that change with both sonar and object aspect, making incoherent image correlation extremely difficult. Coherently, any correlation operation involving signals with non-overlapping frequency bands will yield an answer of zero (since correlation is multiplication in the frequency domain). For two sonar images to correlate it is not enough that their spatial frequencies overlap, but the same points in the two images must be represented at overlapping frequencies. For a generic real aperture sonar, the same signature for a complex scene can only typically be re-observed by revisiting the original observation position and orientation and using the same frequencies. Consequently, in general, getting two complex sonar or radar images to coherently correlate is a measure zero occurrence; the expected cross correlation can be proven to be approaching zero. Incoherent navigation is possible (i.e. using only the envelope) if there is distinct terrain, but against a uniform bottom (mud flat, field of gravel, ocean floor, etc.) this is usually not so.

Holographic navigation of a terrain, e.g., using a system implemented on AUVs, solves this problem by replacing at least one of the real aperture images with a synthetic aperture image. Because a synthetic aperture image is a type of hologram (or quasi-hologram) it contains all possible real aperture images over some range of frequencies and angles. Consequently, it may be possible to correlate a real aperture image against the synthetic aperture image and have a non-zero expected cross correlation. However, according to the Closed/Open Aperture theorem, it may be required that the synthetic aperture be a planar synthetic aperture, meaning that it is fully populated and Nyquist sampled in two dimensions. This type of population and sampling frequency is, in general, impractical.

By assuming the terrain is a manifold with embedded scatterers on the surface, and avoiding sub-bottom profiles/operating above the critical angle, or operating below the critical angle where the SNR is low, it is possible to show that the planar aperture can be replaced with a contour aperture provided the frequencies can rescaled. For example, consider an active sonar or radar and two scatterers spaced 5 centimeters apart in range on a flat bottom. From the perspective of a sonar or radar looking at the scatterers from the ground, the distance of travel for the two echoes differ by 10 cm (out and back). If the observer is, instead, looking down at an angle of 45 degrees above horizontal, the difference is shorted by cosine of 45 degrees (half) to 7.07 cm. So at horizontal a 10 cm wavelength would be exactly one cycle out of phase (constructively interferes), and a 20 centimeter wavelength would be exactly a half cycle out of phase (destructively interfere). At 45 degrees, the same would be true of a 7.07 cm wavelength and a 14.14 cm wavelength. Both wavelengths are scaled by the same amount (and, similarly, so are frequencies, except inversely). More generally, a change in vertical angle shifts all frequencies and changes the signal length by the cosine of the angle. This is not a shift in frequency so much as a change in pitch, where a doubling in frequency corresponds to a change in pitch of one octave. So by changing the observation angle from horizontal to looking down at 60 degrees the expected return is shorted by half and increases in pitch by one octave. In order for this to work, it is necessary for the second observation to be made with appropriately scaled frequencies relative to the first; for a very narrowband system too much of a change in grazing angle simply leads to the known signatures being out of band.

In some embodiments, using grazing angle compensation and a prior synthetic aperture image of the systems and methods described herein, it is possible to navigate relative to terrain using a single element sonar or radar. Although synthetic aperture systems are extremely expensive, single element systems are generally very cheap. This means a very expensive mapping system can enable the widespread use of cheap autonomous systems with minimal inertial navigation. However, successful holographic navigation implementations to date have all used low frequency sonars (i.e. under 50 kHz), while the higher frequency systems have not worked. This is unfortunate, because lower frequency transmitters are, in general, larger, higher power, and more expensive. Thus, it is desirable to have a high frequency single element holographic navigation system. Further illustrative embodiments of holographic navigation systems and methods are disclosed in U.S. patent application Ser. Nos. 12/802,453, 12/454,486, 12/454,484, and 12/454,885, the contents of each of which are incorporated herein by reference in their entirety.

As noted above, the system 100 includes a sonar unit 110 for transmitting and receiving acoustic signals. The sonar unit includes a transducer array 112 having a one or more transmitting elements or projectors and a plurality of receiving elements arranged in a row. In certain embodiments the transducer array 112 includes separate projectors and receivers. The transducer array 112 may be configured to operate in SAS mode (either stripmap or spotlight mode) or in a real aperture mode. In certain embodiments, the transducer array 112 is configured to operate as a multibeam echo sounder, sidescan sonar or sectorscan sonar. The transmitting elements and receiving elements may be sized and shaped as desired and may be arranged in any configuration, and with any spacing as desired without departing from the scope of the present disclosure. The number, size, arrangement and operation of the transducer array 112 may be selected and controlled to insonify terrain and generate high-resolution images of a terrain or object. One example of an array 112 includes a 16 channel array with 5 cm elements mounted in a 12¾ inch vehicle.

The sonar unit 110 further includes a receiver 114 for receiving and processing electrical signals received from the transducer, and a transmitter 116 for sending electrical signals to the transducer. The sonar unit 110 further includes a transmitter controller 118 for controlling the operation of the transmitter including the start and stop, and the frequency of a ping.

The signals received by the receiver 114 are sent to a preprocessor for conditioning and compensation. Specifically, the preprocessor 120 includes a filter conditioner 122 for eliminating outlier values and for estimating and compensating for hydrophone variations. The preprocessor further includes a Doppler compensator 124 for estimating and compensating for the motion of the vehicle. The preprocessed signals are sent to a matched filter 130.

The matched filter 130 includes a pulse compressor 132 for performing matched filtering in range, and a beamformer 134 for performing matched filtering in azimuth and thereby perform direction estimation.

The signal corrector 140 includes a grazing angle compensator 142 for adjusting sonar images to compensate for differences in grazing angle. Typically, if a sonar images a collection of point scatterers the image varies with observation angle. For example, a SAS system operating at a fixed altitude and heading observing a sea floor path will produce different images at different ranges. Similarly, SAS images made at a fixed horizontal range would change if altitude were varied. In such cases, changes in the image would be due to changes in the grazing angle. The grazing angle compensator 142 is configured to generate grazing angle invariant images. One such grazing angle compensator is described in U.S. patent application Ser. No. 12/802,454 titled "Apparatus and Method for Grazing Angle Independent Signal Detection," the contents of which are incorporated herein by reference in their entirety.

The signal corrector 140 includes a phase error corrector 144 for correcting range varying phase errors. Generally, the phase error corrector 144 breaks the image up into smaller pieces, each piece having a substantially constant phase error. Then, the phase error may be estimated and corrected for each of the smaller pieces.

The system 100 further includes a signal detector 150 having a signal correlator 152 and a storage 154. The signal detector 150 may be configured to detect potential targets, estimate the position and velocity of a detected object and perform target or pattern recognition. In one embodiment, the storage 154 may include a map store, which may contain one or more previously obtained SAS images real aperture images or any other suitable sonar image. The signal correlator 152 may be configured to compare the received and processed image obtained from the signal corrector 140 with one or more prior images from the map store 154.

The system 100 may include other components, not illustrated, without departing from the scope of the present disclosure. For example, the system 100 may include a data logging and storage engine. In certain embodiments the data logging and storage engine may be used to store scientific data which may then be used in post-processing for assisting with navigation. The system 100 may include a security engine for controlling access to and for authorizing the use of one or more features of system 100. The security engine may be configured with suitable encryption protocols and/or security keys and/or dongles for controlling access. For example, the security engine may be used to protect one or more maps stored in the map store 154. Access to one or more maps in the map store 154 may be limited to certain individuals or entities having appropriate licenses, authorizations or clearances. Security engine may selectively allow these individuals or entities access to one or more maps once it has confirmed that these individuals or entities are authorized. The security engine may be configured to control access to other components of system 100 including, but not limited to, navigation controller 170, motor controller 180, sensor controller 190, transmitter controller 118, and CCU 160.

Figure 2:
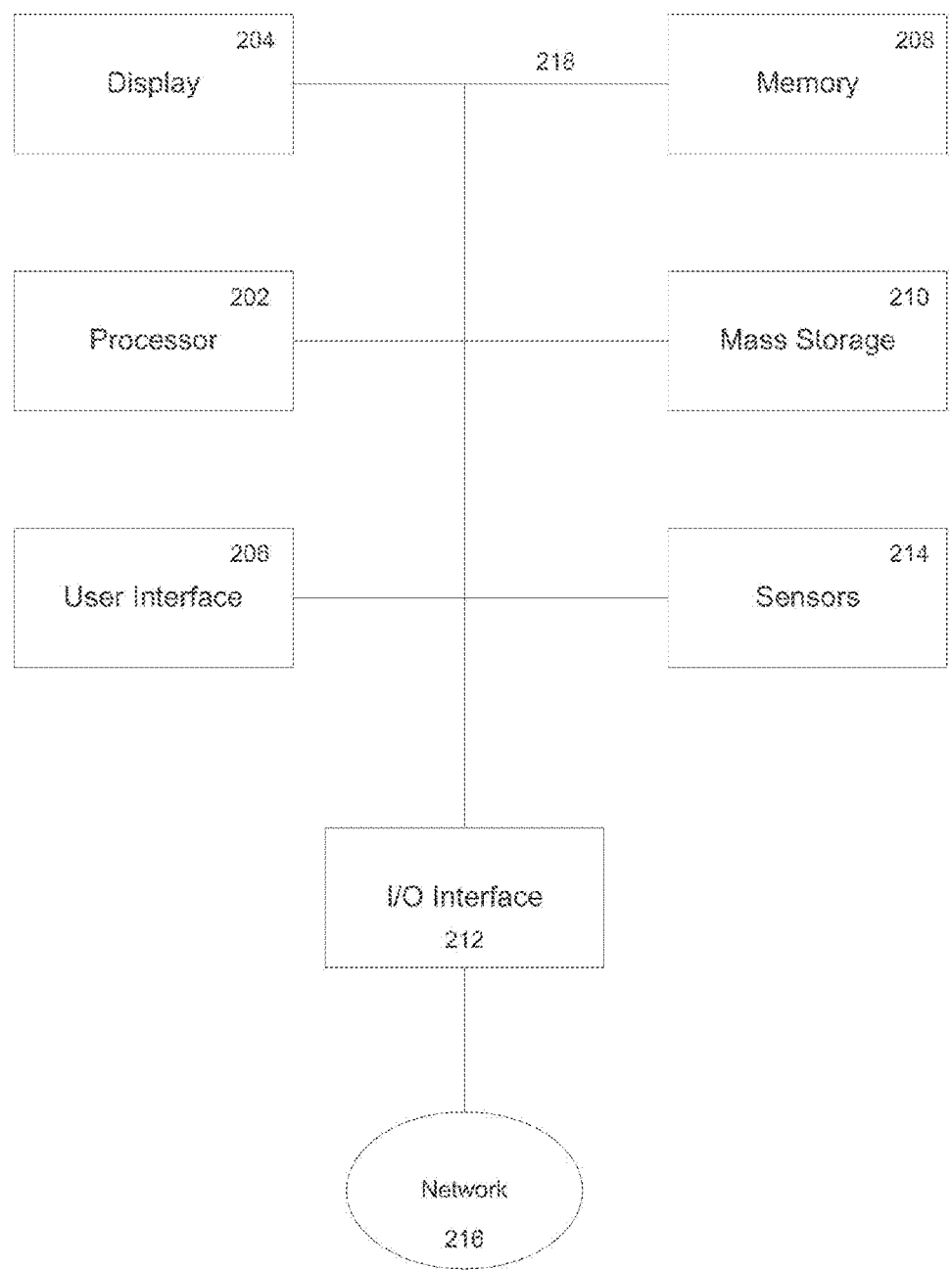
FIG. 2 is block diagram of an exemplary computer system for implementing at least a portion of the systems and methods described in the present disclosure.

Generally, with the exception of the transducer 112, the various components of system 100 may be implemented in a computer system, such as computer system 200 of FIG. 2. More particularly, FIG. 2 is a functional block diagram of a general purpose computer accessing a network according to an illustrative embodiment of the present disclosure. The holographic navigation systems and methods described in this application may be implemented using the system 200 of FIG. 2.

The exemplary system 200 includes a processor 202, a memory 208, and an interconnect bus 218. The processor 202 may include a single microprocessor or a plurality of microprocessors for configuring computer system 200 as a multi-processor system. The memory 208 illustratively includes a main memory and a read-only memory. The system 200 also includes the mass storage device 210 having, for example, various disk drives, tape drives, etc. The main memory 208 also includes dynamic random access memory (DRAM) and high-speed cache memory. In operation and use, the main memory 208 stores at least portions of instructions for execution by the processor 202 when processing data (e.g., model of the terrain) stored in main memory 208.

In some embodiments, the system 200 may also include one or more input/output interfaces for communications, shown by way of example, as interface 212 for data communications via the network 216. The data interface 212 may be a modem, an Ethernet card or any other suitable data communications device. The data interface 212 may provide a relatively high-speed link to a network 216, such as an intranet, internet, or the Internet, either directly or through another external interface. The communication link to the network 216 may be, for example, any suitable link such as an optical, wired, or wireless (e.g., via satellite or 802.11 Wi-Fi or cellular network) link. In some embodiments, communications may occur over an acoustic modem. For instance, for AUVs, communications may occur over such a modem. Alternatively, the system 200 may include a mainframe or other type of host computer system capable of web-based communications via the network 216.

In some embodiments, the system 200 also includes suitable input/output ports or may use the Interconnect Bus 218 for interconnection with a local display 204 and user interface 206 (e.g., keyboard, mouse, touchscreen) or the like serving as a local user interface for programming and/or data entry, retrieval, or manipulation purposes. Alternatively, server operations personnel may interact with the system 200 for controlling and/or programming the system from remote terminal devices (not shown in the Figure) via the network 216.

In some embodiments, a system requires a processor, such as a navigational controller 170, coupled to one or more coherent sensors (e.g., a sonar, radar, optical antenna, etc.) 214. Data corresponding to a model of the terrain and/or data corresponding to a holographic map associated with the model may be stored in the memory 208 or mass storage 210, and may be retrieved by the processor 202. Processor 202 may execute instructions stored in these memory devices to perform any of the methods described in this application, e.g., grazing angle compensation, or high frequency holographic navigation.

The system may include a display 204 for displaying information, a memory 208 (e.g., ROM, RAM, flash, etc.) for storing at least a portion of the aforementioned data, and a mass storage device 210 (e.g., solid-state drive) for storing at least a portion of the aforementioned data. Any set of the aforementioned components may be coupled to a network 216 via an input/output (I/O) interface 212. Each of the aforementioned components may communicate via interconnect bus 218.

In some embodiments, the system requires a processor coupled to one or more coherent sensors (e.g., a sonar, radar, optical antenna, etc.) 214. The sensor array 214 may include, among other components, a transmitter, receive array, a receive element, and/or a virtual array with an associated phase center/virtual element.

Data corresponding to a model of the terrain, data corresponding to a holographic map associated with the model, and a process for grazing angle compensation may be performed by a processor 202. The system may include a display 204 for displaying information, a memory 208 (e.g., ROM, RAM, flash, etc.) for storing at least a portion of the aforementioned data, and a mass storage device 210 (e.g., solid-state drive) for storing at least a portion of the aforementioned data. Any set of the aforementioned components may be coupled to a network 216 via an input/output (I/O) interface 212. Each of the aforementioned components may communicate via interconnect bus 218.

In operation, a processor 202 receives a position estimate for the sensor(s) 214, a waveform or image from the sensor(s) 214, and data corresponding to a model of the terrain, e.g., the sea floor. In some embodiments, such a position estimate may not be received and the process performed by processor 202 continues without this information. Optionally, the processor 202 may receive navigational information and/or altitude information, and a processor 202 may perform a coherent image rotation algorithm. The output from the system processor 202 includes the position to which the vehicle needs to move to.

The components contained in the system 200 are those typically found in general purpose computer systems used as servers, workstations, personal computers, network terminals, portable devices, and the like. In fact, these components are intended to represent a broad category of such computer components that are well known in the art.

It will be apparent to those of ordinary skill in the art that methods involved in the systems and methods of the invention may be embodied in a computer program product that includes a non-transitory computer usable and/or readable medium. For example, such a computer usable medium may consist of a read only memory device, such as a CD ROM disk, conventional ROM devices, or a random access memory, a hard drive device or a computer diskette, a flash memory, a DVD, or any like digital memory medium, having a computer readable program code stored thereon.

Optionally, the system may include an inertial navigation system, a Doppler sensor, an altimeter, a gimbling system to fixate the sensor on a populated portion of a holographic map, a global positioning system (GPS), a long baseline (LBL) navigation system, an ultrashort baseline (USBL) navigation, or any other suitable navigation system.

Figure 3:
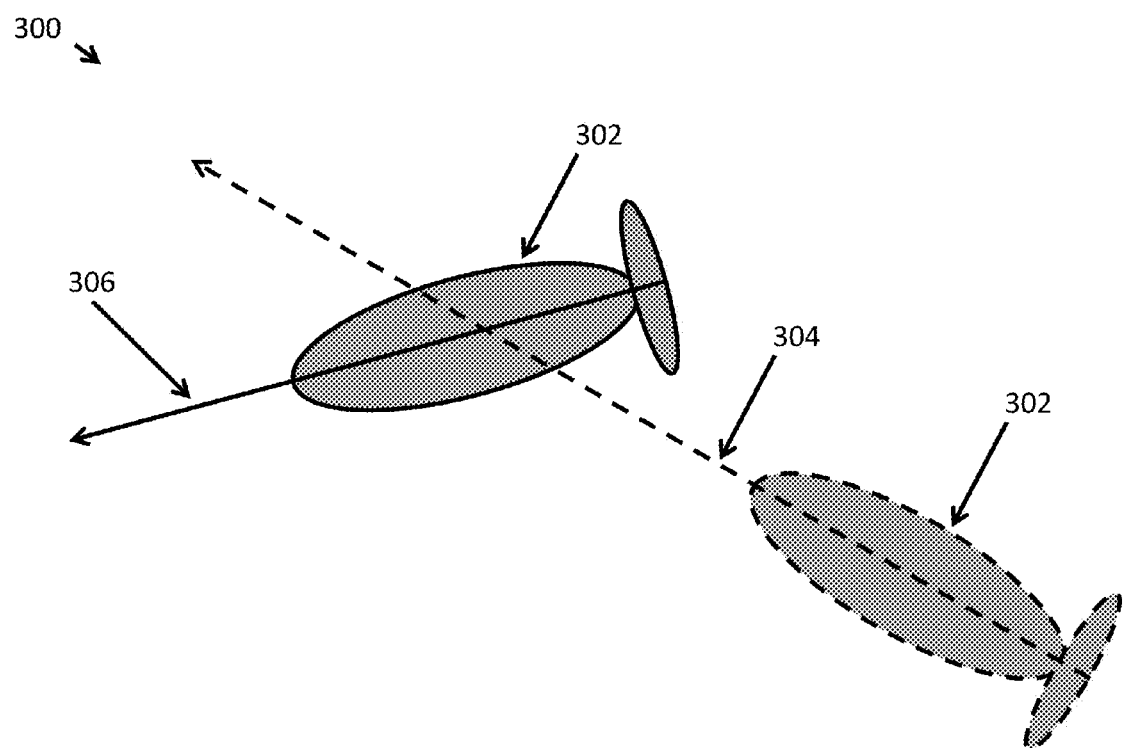
FIG. 3 depicts an illustrative example of a vehicle maneuver to calculate a velocity state of a vehicle.

FIG. 3 depicts an illustrative example of a vehicle maneuver to calculate a velocity state of a vehicle. The maneuver 300 includes a vehicle 302 at a first time T1 going in first direction 304, and the same vehicle 302 at a second time T2 going in second direction 306. The vehicle 302 may transmit a first signal in the first direction 304 using at least one transducer. The vehicle 302 may use a Doppler sensor to receive an echo of the first signal. The vehicle 302 may receive the echo of the first signal at time T1, time T2, a time between T1 and T2, or any time after T2. The vehicle 302 may then turn to a second direction 306, wherein the second direction 306 is different than the first direction 304. In some embodiments, the second direction 306 may be orthogonal to the first direction 304. The second signal may involve measurements of components of the velocity state that were previously unobservable from the first signal. The vehicle 302 may transmit a second signal in the second direction 306 using at least one transducer. The vehicle 302 may use a Doppler sensor to receive an echo of the second signal. The vehicle 302 may receive the echo of the second signal at time T2 or any time after T2.

In some embodiments, the second signal may be transmitted from the same transducer as the first signal. In alternate embodiments, the second signal may be transmitted from a different transducer as the first signal.

Based on the received echoes of the first and second signals, the vehicle 302 may calculate at least a portion of the vehicle velocity state. In some embodiments, the vehicle 302, using processing circuitry such as processor 202, may calculate a Doppler shift for each of the first and second signal and calculate a first and second velocity measurements based on the respective Doppler shifts.

Figure 4:
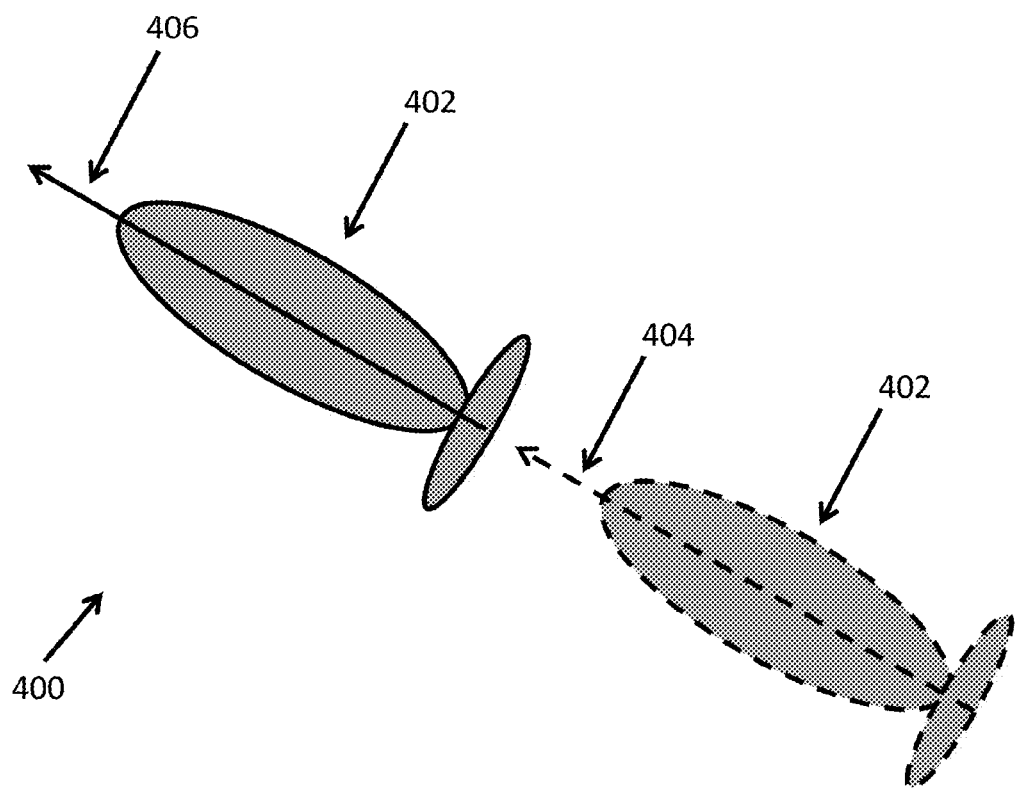
FIG. 4 depicts another illustrative example of a vehicle maneuver to calculate a velocity state of a vehicle.

FIG. 4 depicts another illustrative example of a vehicle maneuver to calculate a velocity state of a vehicle. The maneuver 400 includes a vehicle 402 at a first time T1 going in first direction 404, and the same vehicle 402 at a second time T2 going in second direction 406. The first direction 404 and the second direction 406 may be the same or substantially similar. The vehicle 402 may transmit a first signal in the first direction 304 using at least one transducer. The vehicle 402 may use a Doppler sensor to receive an echo of the first signal. The vehicle 402 may receive the echo of the first signal at time T1, time T2, a time between T1 and T2, or any time after T2. The vehicle 402 may transmit a second signal in the second direction 406 using at least one transducer. The vehicle 402 may use a Doppler sensor to receive an echo of the second signal. The vehicle 402 may receive the echo of the second signal at time T2 or any time after T2.

In some embodiments, the second signal may be transmitted from the same transducer as the first signal. In alternate embodiments, the second signal may be transmitted from a different transducer as the first signal.

Based on the received echoes of the first and second signals, the vehicle 402 may calculate at least a portion of the vehicle velocity state. In some embodiments, the vehicle 402, using processing circuitry such as processor 202, may calculate a Doppler shift for each of the first and second signal and calculate a first and second velocity measurement based on the respective Doppler shifts. In alternative embodiments, the vehicle 402, using processing circuitry such as processor 202, may calculate the distance traveled between T1 and T2 based on the echoes of the first and second signal. Using this information, the vehicle 402 may calculate a single velocity estimate.

Figure 5:
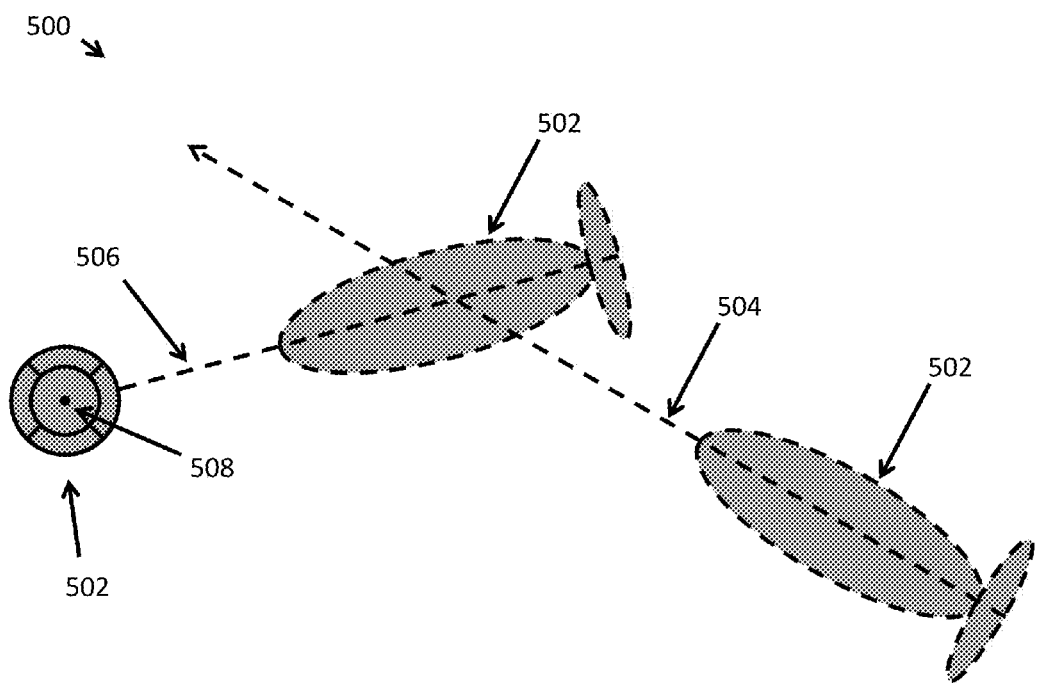
FIG. 5 depicts another illustrative example of a vehicle maneuver to calculate a velocity state of a vehicle.

FIG. 5 depicts another illustrative example of a vehicle maneuver to calculate a velocity state of a vehicle. The maneuver 500 includes a vehicle 502 at a first time T1 going in first direction 504, the same vehicle 502 at a second time T2 going in second direction 506, and the same vehicle 502 at a third time T3 going in a third direction 508 (coming out of the page). In FIG. 5, directions 504, 506, and 508 are shown as different for illustrative purposes, but in some embodiments, any two or three of the directions 504, 506, and 508 may be the same or substantially different. In some embodiments, any two of the directions 504, 506, or 508 may be orthogonal. The vehicle 502 may transmit a first signal in the first direction 504 using at least one transducer. The vehicle 502 may use a Doppler sensor to receive an echo of the first signal. The vehicle 502 may receive the echo of the first signal at time T1, a time between T1 and T3, or any time after T3. The second signal may involve measurements of components of the velocity state that were previously unobservable from the first signal. The vehicle 502 may transmit a second signal in the second direction 506 using at least one transducer. The vehicle 502 may use a Doppler sensor to receive an echo of the second signal. The vehicle 502 may receive the echo of the second signal at time T2 or any time after T2. The third signal may involve measurements of components of the velocity state that were previously unobservable from the first and the second signal. The vehicle 502 may transmit a third signal in the third direction 508 using at least one transducer. The vehicle 502 may use a Doppler sensor to receive an echo of the third signal. The vehicle 502 may receive the echo of the third signal at time T3 or any time after T3.

In some embodiments, the second and third signals may be transmitted from the same transducer as the first signal. In alternate embodiments, the second and third signals may be transmitted from one or more different transducers as the first signal.

Based on the received echoes of the first, second, and third signals, the vehicle 502 may calculate at least a portion of the vehicle velocity state. In some embodiments, the vehicle 502, using processing circuitry such as processor 202, may calculate a Doppler shift for each of the first and second signal and calculate a first, second, and third velocity measurements based on the respective Doppler shifts.

Figure 6:
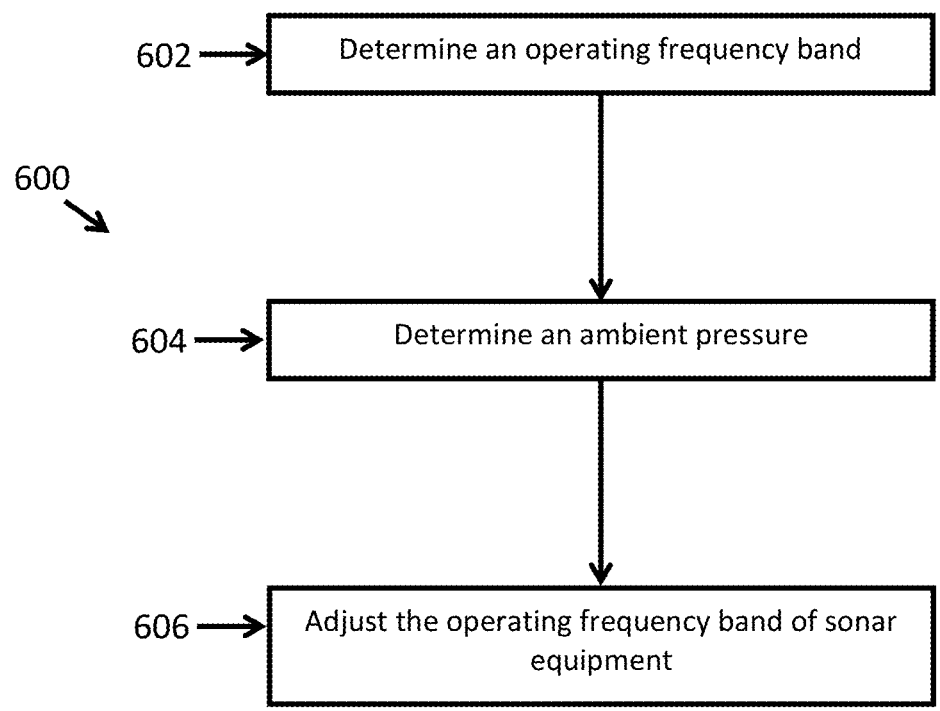
FIG. 6 depicts a process for using a variable depth sonar system, according to one illustrative embodiment.

FIG. 6 depicts a process for using a variable depth sonar system, according to one illustrative embodiment. Process 600 includes the steps of determining an operating frequency band at step 602, determining an ambient pressure at step 604, and adjusting the operating frequency band of sonar equipment at step 606.

At step 602, an operating frequency band for sonar equipment may be determined. The frequency response for sonar equipment typically include nulls, and the operating bands are typically designed to occur between the nulls. As an illustrative example, a sonar receiver may be designed to operate in several operating bands, such as a broad bandwidth low frequency (BBLF) band and a separate high frequency (HF) band, with an intentionally engineered null separating the two bands. This information may be stored on board the vehicle, in, for example, memory 208.

At step 604, an ambient pressure may be determined. Determining the ambient pressure may comprise determining a current depth of the sonar equipment or of the vehicle carrying the sonar equipment. A pre-determined relationship or table correlating current depth with pressure may be used to determine the ambient pressure based on the current depth.

At step 606, the operating frequency band of the sonar equipment may be adjusted based on the ambient pressure. In some embodiments, a center operating frequency may be adjusted based on pressure. In some embodiments, a pre-determined table correlating pressure and frequency response may be used to determine an optimal center operating frequency. In some embodiments, the center frequency may be centered between nulls in the frequency response and/or an upper limit or bound in the operating band.

Figure 7:
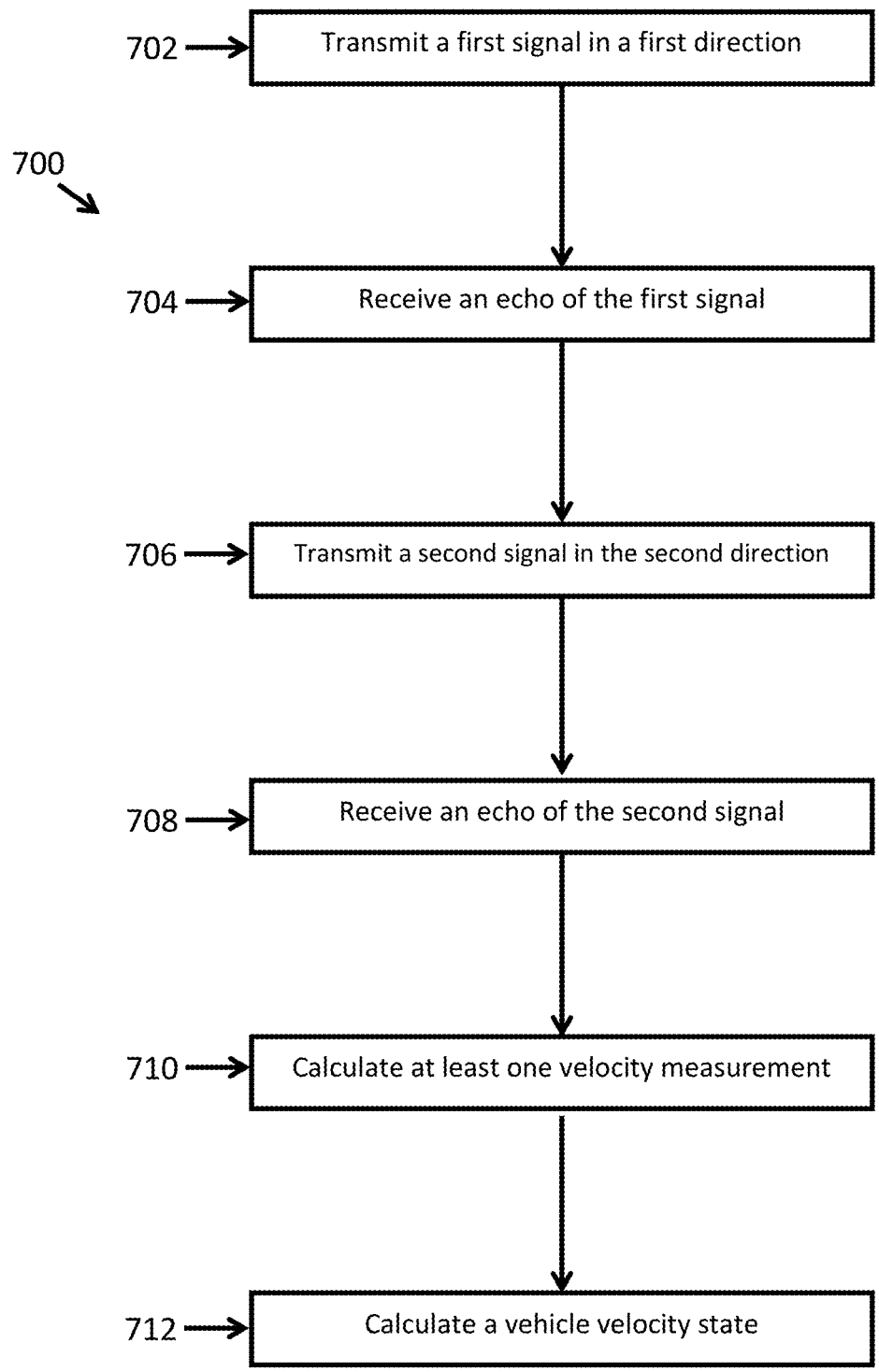
FIG. 7 depicts a process for calculating a velocity state of a vehicle, according to one illustrative embodiment.

FIG. 7 depicts a process for calculating a velocity state of a vehicle, according to one illustrative embodiment. Process 700 comprises transmitting a first signal in a first direction at step 702, receiving an echo of the first signal at step 704, transmitting a second signal in a second direction at step 706, receiving an echo of the second signal at step 708, calculating at least one velocity measurement at step 710, and calculating a vehicle velocity state at step 712.

At step 702, a first signal may be transmitted in a first direction. The first signal may be transmitting using at least one transducer. At step 704, a Doppler sensor may be used to receive an echo of the first signal.

At step 706, a second signal may be transmitted in a second direction. The second direction may be the same, substantially the same, or different than the first direction. In some embodiments, a vehicle may have physically turned such that the second direction is substantially different than the first direction. In alternative embodiments, the vehicle may be traveling in substantially the same direction, but the transducer may be turned so that the second signal is transmitted in a substantially different direction as the first signal. In some embodiments, the second direction may be orthogonal to the first direction. In some embodiments, the second signal may involve measurements of the components of the velocity state that were previously unobservable from the first signal. The second signal may be transmitted using the same or a different transducer as the first signal. At step 708, a Doppler sensor may be used to receive an echo of the second signal.

At step 710, processing circuitry such as processor 202 may calculate at least one velocity measurement. In some embodiments, the processing circuitry may calculate a Doppler shift for each of the first and second signal based on the received echoes and calculate a respective first and second velocity measurement based on the respective Doppler shifts. In alternative embodiments, the processing circuitry may calculate the distance traveled in the time between the first signal and the second signal based on the received echoes. Using this information, the processing circuitry may calculate a single velocity estimate based on the two received echoes.

At step 712, the processing circuitry may calculate a vehicle velocity state. In some embodiments, the at least one velocity measurement may be provided to a navigation filter that updates one or more components of the vehicle's velocity state based on the at least one velocity measurement.

Figure 8:
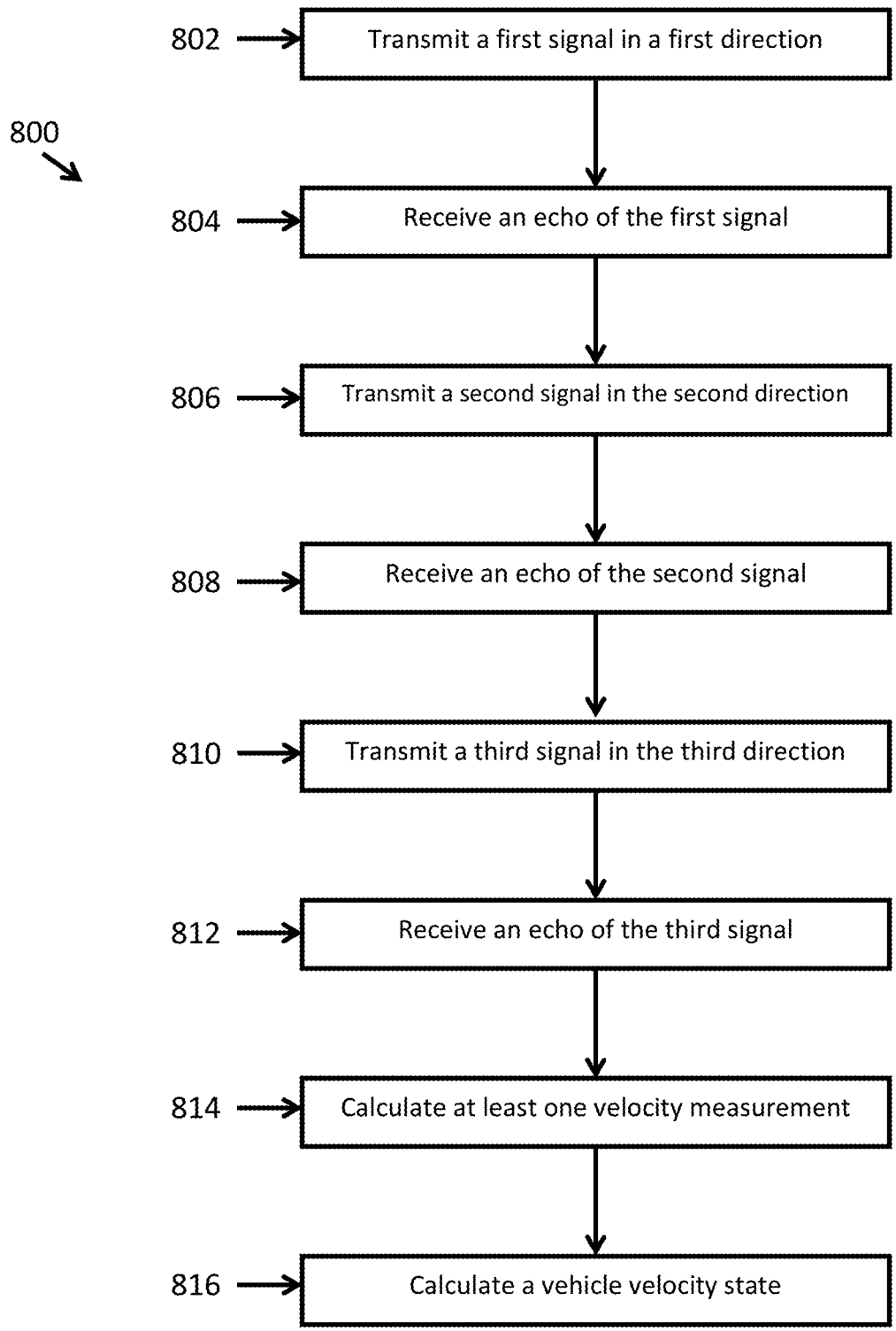
FIG. 8 depicts another process for calculating a velocity state of a vehicle, according to one illustrative embodiment.

FIG. 8 depicts another process for calculating a velocity state of a vehicle, according to one illustrative embodiment. Process 800 comprises transmitting a first signal in a first direction at step 802, receiving an echo of the first signal at step 804, transmitting a second signal in a second direction at step 806, receiving an echo of the second signal at step 808, transmitting a third signal in a third direction at step 810, receiving an echo of the third signal at step 812, calculating at least one velocity measurement at step 814, and calculating a vehicle velocity state at step 816.

At step 802, a first signal may be transmitted in a first direction. The first signal may be transmitting using at least one transducer. At step 804, a Doppler sensor may be used to receive an echo of the first signal.

At step 806, a second signal may be transmitted in the second direction. The second direction may be the same, substantially the same, or different than the first direction. In some embodiments, a vehicle may have physically turned such that the second direction is substantially different than the first direction. In alternative embodiments, the vehicle may be traveling in substantially the same direction, but the transducer may be turned so that the second signal is transmitted in a substantially different direction as the first signal. In some embodiments, the second direction may be orthogonal to the first direction. In some embodiments, the second signal may involve measurements of the components of the velocity state that were previously unobservable from the first signal. The second signal may be transmitted using the same or a different transducer as the first signal. At step 808, a Doppler sensor may be used to receive an echo of the second signal.

At step 810, a third signal may be transmitted in a third direction. The third direction may be the same, substantially the same, or different than the first and the second direction. In some embodiments, the vehicle may have physically turned such that the third direction is substantially different than the first and the second direction. In alternative embodiments, the vehicle may continue traveling in substantially the same direction, but the transducer may be turned so that the third signal is transmitted in a substantially different direction as the first and second signals. In some embodiments, the third direction may be orthogonal to either the first or second direction. In some embodiments, the third signal may involve measurements of the components of the velocity state that were previously unobservable from the first and second signals. The third signal may be transmitted using the same or a different transducer as the first and second signals. At step 812, a Doppler sensor may be used to receive an echo of the third signal.

At step 814, processing circuitry such as processor 202 may calculate a vehicle velocity state. In some embodiments, the processing circuitry may calculate a Doppler shift for each of the first, second, and third signals based on the received echoes and calculate a respective first, second, and third velocity measurements based on the respective Doppler shifts. In alternative embodiments, the processing circuitry may calculate the distance traveled in the time between any two of the first, second, and third signals and use the distance information to calculate a velocity measurement based on any two of the three signals.

At step 816, the processing circuitry may calculate a vehicle velocity state. In some embodiments, the at least one velocity measurement may be provided to a navigation filter that updates one or more components of the vehicle's velocity state based on the at least one velocity measurement.

It will be apparent to those skilled in the art that such embodiments are provided by way of example only. It should be understood that numerous variations, alternatives, changes, and substitutions may be employed by those skilled in the art in practicing the invention. Accordingly, it will be understood that the invention is not to be limited to the embodiments disclosed herein, but is to be understood from the following claims, which are to be interpreted as broadly as allowed under the law.

What is claimed is:

1. A method for using variable-depth sonar, comprising:
   determining one or more frequency bands for sonar equipment;
   identifying nulls in a frequency response based on the one or more frequency bands;
   determining an ambient pressure applied to the sonar equipment; and
   adjusting a center operating frequency for the one or more frequency bands based on the ambient pressure and the identified nulls in the frequency response.

2. The method of claim 1, wherein determining the ambient pressure applied to the sonar equipment comprises determining a current depth.

3. The method of claim 1, wherein the one or more frequency bands comprise a first frequency band and a second frequency band, and wherein the identified nulls in the frequency response occur between the first frequency band and the second frequency band.

4. The method of claim 3, wherein the center operating frequency of the first frequency band and the center operating frequency of the second frequency band are centered between the identified nulls in the frequency response and a respective limiting frequency of the first frequency band and the second frequency band.

5. A variable-depth sonar system comprising:
   a pressure sensor configured to detect an ambient pressure applied to the sonar system; and
   processing circuitry configured to:
      determine one or more frequency bands for the sonar system;
      identify nulls in a frequency response based on the one or more frequency bands;
      receive the ambient pressure from the pressure sensor; and
      adjust a center operating frequency for the one or more frequency bands based on the ambient pressure and the identified nulls in the frequency response.

6. The system of claim 5, wherein the processing circuitry is configured to determine the ambient pressure applied to the sonar equipment by determining a current depth.

7. The system of claim 5, wherein the one or more frequency bands comprise a first frequency band and a second frequency band, wherein the identified nulls in the frequency response occurs between the first frequency band and the second frequency band.

8. The system of claim 7, wherein the center operating frequency of the first frequency band and the center operating frequency of the second frequency band are centered between the identified nulls in the frequency response and a respective limiting frequency of the first frequency band and the second frequency band.

* * * * *